(12) United States Patent
Thomson

(10) Patent No.: US 9,383,097 B2
(45) Date of Patent: Jul. 5, 2016

(54) SYSTEMS AND METHOD FOR COOLING A STAGED AIRBLAST FUEL INJECTOR

(75) Inventor: Neal A. Thomson, West Des Moines, IA (US)

(73) Assignee: Rolls-Royce plc (GB)

( * ) Notice: Subject to any disclaimer, the term of this patent is extended or adjusted under 35 U.S.C. 154(b) by 1029 days.

(21) Appl. No.: 12/932,958

(22) Filed: Mar. 10, 2011

(65) Prior Publication Data

US 2012/0228397 A1   Sep. 13, 2012

(51) Int. Cl.
| | |
|---|---|
| *B05B 17/04* | (2006.01) |
| *F23D 11/10* | (2006.01) |
| *F23R 3/28* | (2006.01) |
| *F23R 3/34* | (2006.01) |
| *F02C 7/236* | (2006.01) |

(52) U.S. Cl.
CPC ............. *F23D 11/107* (2013.01); *F02C 7/2365* (2013.01); *F23R 3/28* (2013.01); *F23R 3/343* (2013.01); *F23D 2900/11101* (2013.01)

(58) Field of Classification Search
CPC .......... B05B 1/14; B05B 1/34; B05B 1/3405; B05B 1/341; B05B 17/04
USPC ................ 60/740–748, 776; 239/13, 399, 239/403–406, 553
See application file for complete search history.

(56) References Cited

U.S. PATENT DOCUMENTS

| | | |
|---|---|---|
| 1,875,457 A | 9/1932 | Hemmingsen |
| 4,601,428 A | 7/1986 | Kurogo |
| 4,756,508 A | 7/1988 | Giachino et al. |
| 4,957,239 A | 9/1990 | Tempelman |
| 4,982,716 A | 1/1991 | Takeda et al. |
| 5,054,691 A | 10/1991 | Huang et al. |
| 5,570,580 A | 11/1996 | Mains |
| 5,767,384 A | 6/1998 | Wang et al. |
| 6,240,732 B1 | 6/2001 | Allan |

(Continued)

FOREIGN PATENT DOCUMENTS

| | | |
|---|---|---|
| DE | 1008068 B | 5/1957 |
| EP | 1312866 A2 | 5/2003 |

(Continued)

OTHER PUBLICATIONS

European Extended Search Report for Application No. EP12250054 dated May 5, 2015, 5 pages.

(Continued)

*Primary Examiner* — Arthur O Hall
*Assistant Examiner* — Viet Le
(74) *Attorney, Agent, or Firm* — Barnes & Thornburg LLP

(57) ABSTRACT

The present invention is directed to a staged fuel injector that includes, inter alia, a main fuel circuit for delivering fuel to a main fuel atomizer and a pilot fuel circuit for delivering fuel to a pilot fuel atomizer which is located radially inward of the main fuel atomizer. The main fuel atomizer includes a radially outer prefilmer and a radially inner fuel swirler. Portions of the main fuel circuit are formed in the prefilmer and portions of the pilot fuel circuit are formed in the prefilmer and the fuel swirler and are positioned proximate to and in thermal contact with fuel exit ports associated with the main fuel circuit and formed in the prefilmer. As a result, the pilot fuel circuit cools the stagnant fuel located in main fuel circuit, including the exit ports, even when performing at engine power levels of up to 60% of the maximum take-off thrust.

9 Claims, 12 Drawing Sheets

(56) References Cited

U.S. PATENT DOCUMENTS

| | | |
|---|---|---|
| 6,523,350 B1 | 2/2003 | Mancini et al. |
| 6,547,163 B1 | 4/2003 | Mansour et al. |
| 6,622,488 B2 | 9/2003 | Mansour et al. |
| 6,672,066 B2 | 1/2004 | Wrubel et al. |
| 6,688,534 B2 | 2/2004 | Bretz ................ 239/8 |
| 6,718,770 B2 | 4/2004 | Laing et al. |
| 6,755,024 B1 * | 6/2004 | Mao et al. .......... 60/776 |
| 7,028,483 B2 * | 4/2006 | Mansour et al. ........ 60/748 |
| 7,506,510 B2 * | 3/2009 | Thomson ............ 60/740 |
| 2003/0221429 A1 | 12/2003 | Laing et al. .......... 60/740 |
| 2004/0148937 A1 | 8/2004 | Mancini |
| 2004/0148938 A1 | 8/2004 | Mancini et al. |
| 2005/0087630 A1 | 4/2005 | Sayar |
| 2006/0059915 A1 * | 3/2006 | Furletov et al. ........ 60/740 |
| 2007/0163263 A1 | 7/2007 | Thomson |
| 2009/0140073 A1 | 6/2009 | Thomson et al. |

FOREIGN PATENT DOCUMENTS

| | | |
|---|---|---|
| EP | 1471308 A1 | 10/2004 |
| EP | 1512912 A2 | 3/2005 |
| EP | 1750056 A8 | 2/2007 |
| EP | 2017534 A1 | 6/2009 |
| EP | 2169313 A2 | 3/2010 |
| GB | 2374406 A | 10/2002 |
| GB | 2404976 A | 2/2005 |

OTHER PUBLICATIONS

Extended European Search Report for related European Patent Application No. 13169005.9-1605 / 2667098, search completed Sep. 23, 2015, 6 pages.

Extended European Search Report, European Application No. 12182739.8, completed Nov. 20, 2015, (9 pages).

\* cited by examiner

SYSTEMS AND METHOD FOR COOLING A STAGED AIRBLAST FUEL INJECTOR

BACKGROUND OF THE INVENTION

1. Field of the Invention

The subject invention is directed to fuel injection, and more particularly, to systems and methods for cooling the exit ports of a main fuel circuit of a staged airblast fuel injector using the pilot fuel flow, at low engine power.

2. Background of the Invention

Staged fuel injectors for gas turbine engines are well known in the art. They typically include a pilot fuel atomizer for use during engine ignition and low power engine operation and at least one main fuel atomizer for use during high power engine operation in concert with the pilot fuel atomizer. One difficulty associated with operating a staged fuel injector is that when the pilot fuel circuit is operating alone during low power operation, stagnant fuel located within the main fuel circuit can be susceptible to carbon formation or coking due to the temperatures associated with the operating environment. This can degrade engine performance over time.

In the past, attempts were made to passively insulate or otherwise protect the main fuel circuit of a staged fuel injector from carbon formation during low power engine operation using heat shields or vents. More recently, efforts have also been made to actively cool a staged fuel injector using the fuel flow from the pilot fuel circuit. U.S. Pat. No. 7,506,510, which was issued to the present inventor and is herein incorporated by reference in its entirety, discloses the use of active cooling to protect against carbon formation in the main fuel circuit of a staged airblast fuel injector. A partial cross-section of the fuel injector nozzle disclosed in U.S. Pat. No. 7,506,510 is shown in FIG. 1. The disclosed staged fuel injector includes a main fuel circuit (170 outer, 172 inner) which delivers fuel to a main fuel atomizer and a pilot fuel circuit (160 outer, 162 inner) for delivering fuel to a pilot fuel atomizer (not shown) located radially inward of the main fuel atomizer. Portions of main fuel and pilot fuel circuits are formed in prefilmer 124 and fuel swirler 126. A spin chamber 128 is formed between the downstream end of the prefilmer 124 and the fuel swirler 126. The main fuel circuit 170/172 delivers fuel to the spin chamber 128 through axially arranged exit slots 170d formed in the fuel swirler 126. The pilot fuel circuit 160/162 is in close proximity to the main fuel circuit 170/172 enroute to the pilot fuel atomizer, so that the pilot fuel flow cools stagnant fuel located within the main fuel circuit 170/172 during low engine power operation to prevent coking.

However, as shown in FIG. 1, the staged fuel injector described in U.S. Pat. No. 7,506,510 uses a single cooling channel 160 to cool the main atomizer exit slots 170d during low power operation. As the staging requirements of lean burn combustion have matured, the need for higher power staging points has increased. The cooling design described in U.S. Pat. No. 7,506,510 functions well at lower compressor discharge temperatures, like those up to about 30% maximum take-off thrust, but in the recent staging requirements the cooling channels must be capable of performing at engine power levels of up to 60% of the maximum take-off thrust. This represents a substantial increase in the compressor discharge temperature of the air and overheats the stagnant fuel in the un-staged main atomizer. Therefore, additionally cooling is necessary.

Accordingly, there is a need in the art for an improved method of actively cooling a staged piloted air blast or dual prefilming pure airblast fuel injector to prevent carbon formation or coking in the main fuel circuit during low power engine operation and in general, to enable the pilot fuel flow to cool the main fuel circuit during high power engine operation, so as to enhance the engine performance and injector life.

SUMMARY OF THE INVENTION

The present invention is directed to a staged fuel injector that includes, inter alia, a main fuel circuit for delivering fuel to a main fuel atomizer and a pilot fuel circuit for delivering fuel to a pilot fuel atomizer which is located radially inward of the main fuel atomizer. The main fuel atomizer includes a radially outer prefilmer and a radially inner fuel swirler. Portions of the main fuel circuit are formed in the prefilmer and portions of the pilot fuel circuit are formed in the prefilmer and the fuel swirler and are positioned proximate to and in thermal contact with fuel exit ports associated with the main fuel circuit and formed in the prefilmer. It is envisioned that the fuel exit ports of the main fuel circuit communicate with a spin chamber formed in the fuel swirler.

In certain embodiments of the present invention, portions of the main fuel circuit are formed in the fuel swirler. Preferably, in such constructions, the main fuel circuit includes at least one radial passage that extends through the prefilmer to provide communication between the portions of the main fuel circuit formed in the prefilmer and the portions of the main fuel circuit formed in the fuel swirler.

It is presently preferred that the pilot fuel circuit includes at least one radial passage that extends through the prefilmer to provide communication between the portions of the pilot fuel circuit formed in the prefilmer and the portions of the pilot fuel circuit formed in the fuel swirler.

In certain constructions of the present invention, the prefilmer is formed using additive manufacturing. Moreover, the fuel swirler can be formed using additive manufacturing. Still further, the prefilmer and at least a portion of the fuel swirler can be integrally formed using additive manufacturing. Exemplary additive manufacturing techniques which can be used in the present invention include, but are not limited to, direct metal laser sintering (DMLS) and deposition modeling. It is envisioned that a portion of the fuel swirler can be formed by machining and is brazed to the portion formed using additive manufacturing.

The present invention is further directed to a staged fuel injector that includes, among other elements, a main fuel atomizer and a pilot fuel atomizer axially located within the main fuel atomizer. The main fuel atomizer includes a radially outer prefilmer and a radially inner fuel swirler. A main fuel circuit is formed in the main fuel atomizer wherein at least a portion of which is formed in the prefilmer. A pilot fuel circuit is formed in the main fuel atomizer and includes an outer pilot fuel circuit portion formed in the prefilmer and an inner pilot fuel circuit portion formed in the inner fuel swirler. The pilot fuel atomizer axially communicates with the pilot fuel circuit and wherein portions of the pilot fuel circuit are positioned proximate to and in thermal contact with fuel exit ports associated with the main fuel circuit which are formed in the prefilmer. As a result, the pilot fuel flow serves to cool stagnant fuel located within the main fuel circuit during low engine power operation, and thereby prevent coking in the main fuel circuit.

In certain embodiments of the present invention, portions of the main fuel circuit are formed in the fuel swirler. Preferably, in such constructions, the main fuel circuit includes at least one radial passage that extends through the prefilmer to provide communication between the portions of the main fuel circuit formed in the prefilmer and the portions of the main fuel circuit formed in the fuel swirler.

It is presently preferred that the pilot fuel circuit includes at least one radial passage that extends through the prefilmer to provide communication between the portions of the pilot fuel circuit formed in the prefilmer and the portions of the pilot fuel circuit formed in the fuel swirler.

In certain constructions of the present invention, the prefilmer is formed using additive manufacturing. Moreover, the fuel swirler can be formed using additive manufacturing. Still further, the prefilmer and at least a portion of the fuel swirler can be integrally formed using additive manufacturing. Exemplary additive manufacturing techniques which can be used in the present invention include, but are not limited to, direct metal laser sintering (DMLS) and deposition modeling. It is envisioned that a portion of the fuel swirler can be formed by machining and is brazed to the portion formed using additive manufacturing.

The present invention is further directed to a method of cooling a staged fuel injector. In the inventive method, a main fuel circuit for delivering fuel to a main fuel atomizer is provided. The main fuel atomizer includes a radially outer prefilmer and a radially inner fuel swirler, wherein portions of the main fuel circuit are formed in the prefilmer. A pilot fuel circuit is also provided for delivering fuel to a pilot fuel atomizer which is located radially inward of the main fuel atomizer. Portions of the pilot fuel circuit are formed in the prefilmer and the fuel swirler and are positioned proximate to and in thermal contact with fuel exit ports associated with the main fuel circuit and formed in the prefilmer. Fuel is directed through the pilot fuel circuit to cool stagnant fuel located within the main fuel circuit during low engine power operation to prevent coking.

The present invention utilizes a pilot and a main fuel circuit layout which moves the main exit slots or ports to accommodate additional cooling channels near the spin chamber. This greatly reduces the maximum temperatures near the main exit slots and allows the engine staging point at much higher engine power.

BRIEF DESCRIPTION OF THE DRAWINGS

So that those skilled in the art to which the subject invention appertains will readily understand how to make and use the systems and method of the subject invention without undue experimentation, preferred embodiments thereof will be described in detail hereinbelow with reference to certain figures, wherein.

Figure 1:
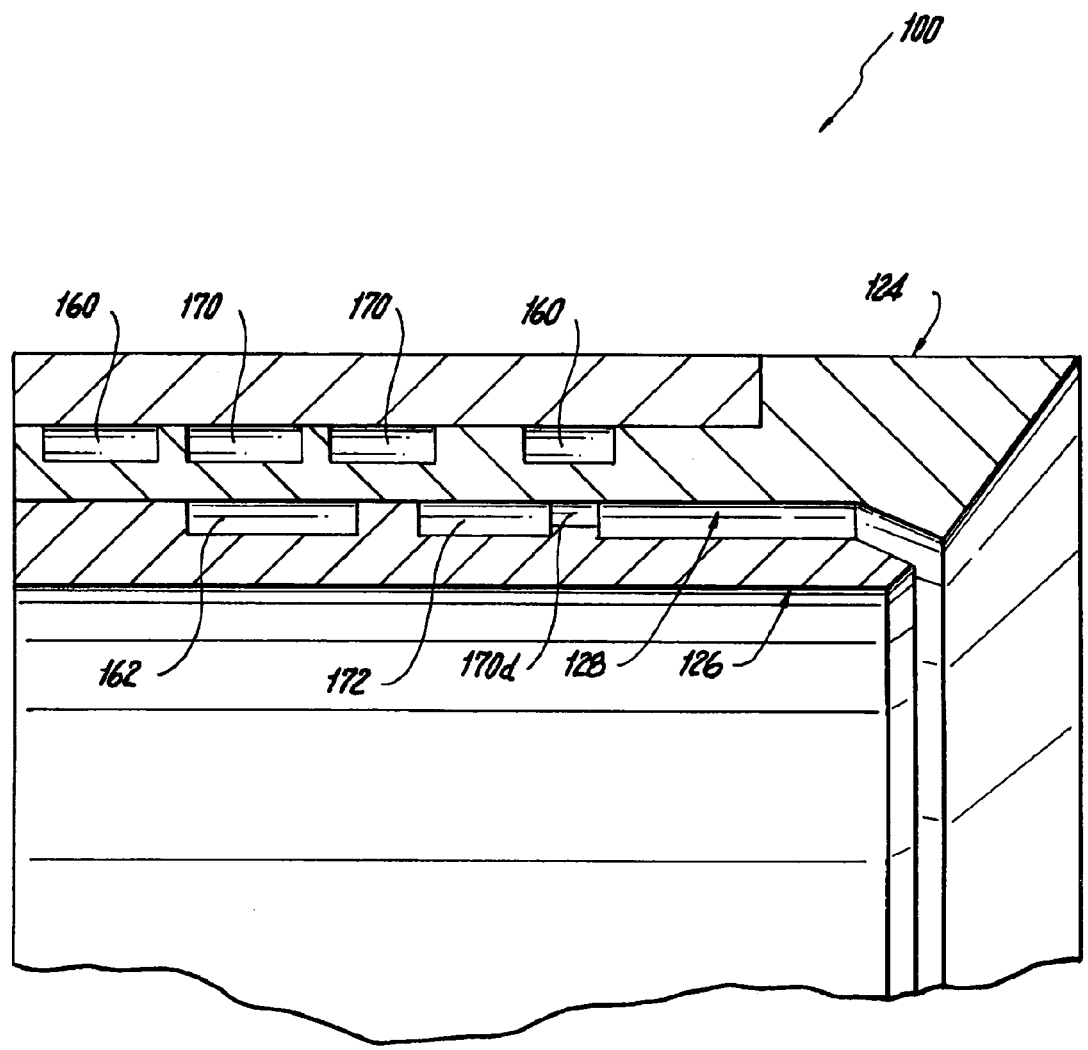
FIG. 1 is a partial cross-sectional view of a prior art staged air blast fuel injector nozzle which illustrates the arrangement of the main fuel circuit and the pilot fuel circuit at the downstream end of the fuel injector nozzle.

These and other aspects of the subject invention will become more readily apparent to those having ordinary skill in the art from the following detailed description of the invention taken in conjunction with the drawings.

DETAILED DESCRIPTION OF THE PREFERRED EMBODIMENTS

Disclosed herein are detailed descriptions of specific embodiments of the systems and methods for cooling a staged fuel injector of the present invention. It will be understood that the disclosed embodiments are merely examples of ways in which certain aspects of the invention can be implemented and do not represent an exhaustive list of all of the ways the invention may be embodied. Indeed, it will be understood that the systems, devices, and methods described herein may be embodied in various and alternative forms. The figures are not necessarily to scale and some features may be exaggerated or minimized to show details of particular components. Well-known components, materials or methods are not necessarily described in great detail in order to avoid obscuring the present disclosure.

Figures illustrating the components show some elements that are known and will be recognized by one skilled in the art. The detailed descriptions of such elements are not necessary to an understanding of the invention, and accordingly, are herein presented only to the degree necessary to facilitate an understanding of the novel features of the present invention.

A unique aspect of the present invention is that the arrangement of the components and the fuel circuits allow additive manufacturing techniques to be used for certain components or portions of the fuel injector. As used herein, additive manufacturing (AM) is defined as the "process of joining materials to make objects from 3D model data, usually layer upon layer, as opposed to subtractive manufacturing methodologies. Synonyms include: additive fabrication, additive processes, additive techniques, additive layer manufacturing, layer manufacturing and freeform fabrication.

The term "additive manufacturing" describes technologies which can be used anywhere throughout the product life cycle from pre-production (i.e. rapid prototyping) to full scale production (also known as rapid manufacturing) and even for tooling applications or post production customization.

Examples of AM are fused deposition modeling and laser sintering. Direct metal laser sintering (DMLS) is an additive metal fabrication technology which is sometimes also referred to by the terms Selective Laser Sintering (SLS) or Selective Laser Melting (SLM). The process involves use of a 3D CAD model whereby a .stl file is created and sent to the machine's software. A technician works with this 3D model to properly orient the geometry for part building and adds supports structure as appropriate. Once this 'build file' has been completed, it is 'sliced' into the layer thickness the machine will build in and downloaded to the DMLS machine allowing the build to begin. The DMLS machine uses a high-powered 200 Watt Yb-fiber optic laser. Inside the build chamber area, there is a material dispensing platform and a build platform along with a recoater blade used to move new powder over the build platform. The technology fuses metal powder into a solid part by melting it locally using the focused laser beam. Parts are built up additively layer by layer, typically using 20 micron layers. This process allows for highly complex geometries to be created directly from the 3D CAD data, fully automatically, in hours and without any tooling. DMLS is a net-shape process, producing parts with high accuracy and detail resolution, good surface quality and excellent mechanical properties.

DMLS has many benefits over traditional manufacturing techniques. Speed is the most obvious because no special tooling is required and parts can be built in a matter of hours. Additionally, DMLS allows for more rigorous testing of prototypes. Since DMLS can use most alloys, prototypes can now be functional hardware made out of the same material as production components. Moreover, DMLS is one of the few additive manufacturing technologies being used in production. It allows more design freedom, and more efficient designs in technical applications. Since the components are built layer by layer, it is possible to design internal features and passages that could not be cast or otherwise machined. Complex geometries and assemblies with multiple components can be simplified to fewer parts with a more cost effective assembly. DMLS does not require special tooling like castings, so production runs can be shorter and supply chains can carry less inventory.

Figure 2:
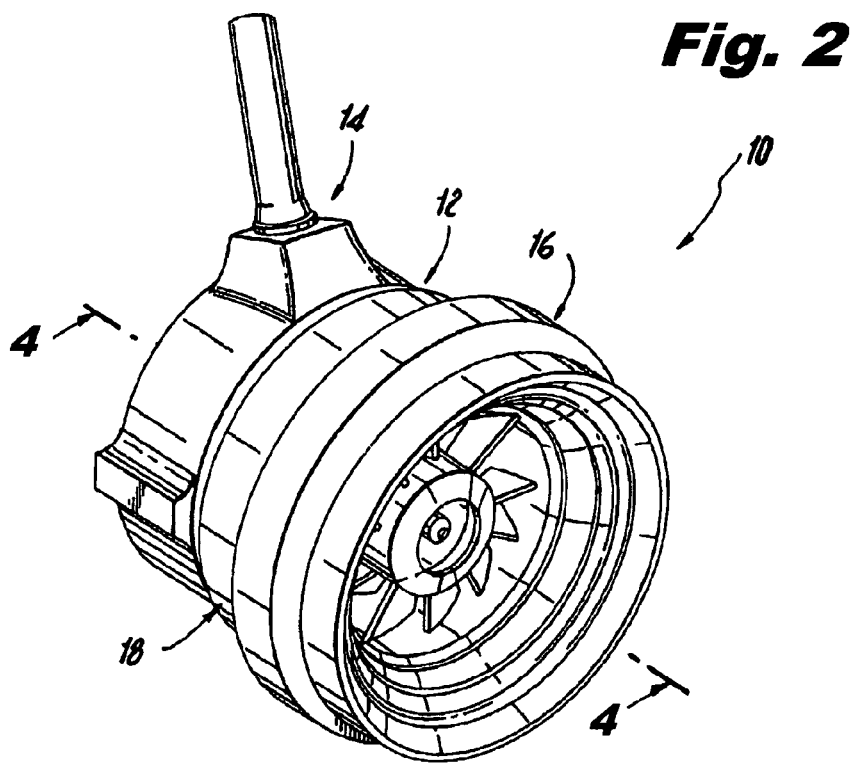
FIG. 2 is a perspective view of a staged air blast fuel injector nozzle constructed in accordance with a preferred embodiment of the present invention, as viewed from a downstream position.

Referring now to the drawings wherein like reference numerals identify similar structural features or aspects of the subject invention, there is illustrated in FIG. 2 a fuel injector constructed in accordance with a preferred embodiment of the subject invention and designated generally by reference numeral 10. Fuel injector 10 is adapted and configured for delivering fuel to the combustion chamber of a gas turbine engine. Fuel injector 10 is generally referred to as a staged fuel injector in that it includes a pilot fuel circuit, which typically operates during engine ignition and at low engine power and a main fuel circuit, which typically operates at high engine power (e.g., at take-off and cruise) and is typically staged off at lower power operation.

Referring to FIG. 2, fuel injector 10 includes a generally cylindrical nozzle body 12, which depends from an elongated feed arm 14. In operation, main and pilot fuel is delivered into nozzle body 12 through concentric fuel feed tubes. These feed tubes include an inner/main fuel feed tube 15 and an outer/pilot fuel feed tube 17 located within the feed arm 14 (see FIG. 4). Although not depicted herein, it is envisioned that the fuel feed tubes could be enclosed within an elongated shroud or protective strut extending from a fuel fitting to the nozzle body.

Figure 3:
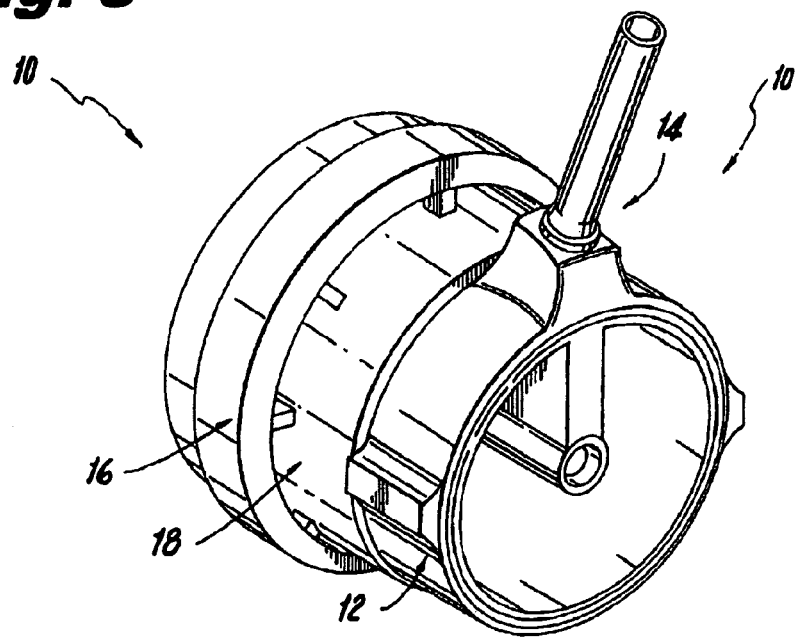
FIG. 3. is a perspective view of the staged air blast fuel injector nozzle of FIG. 1, as viewed from an upstream position.
Figure 4:
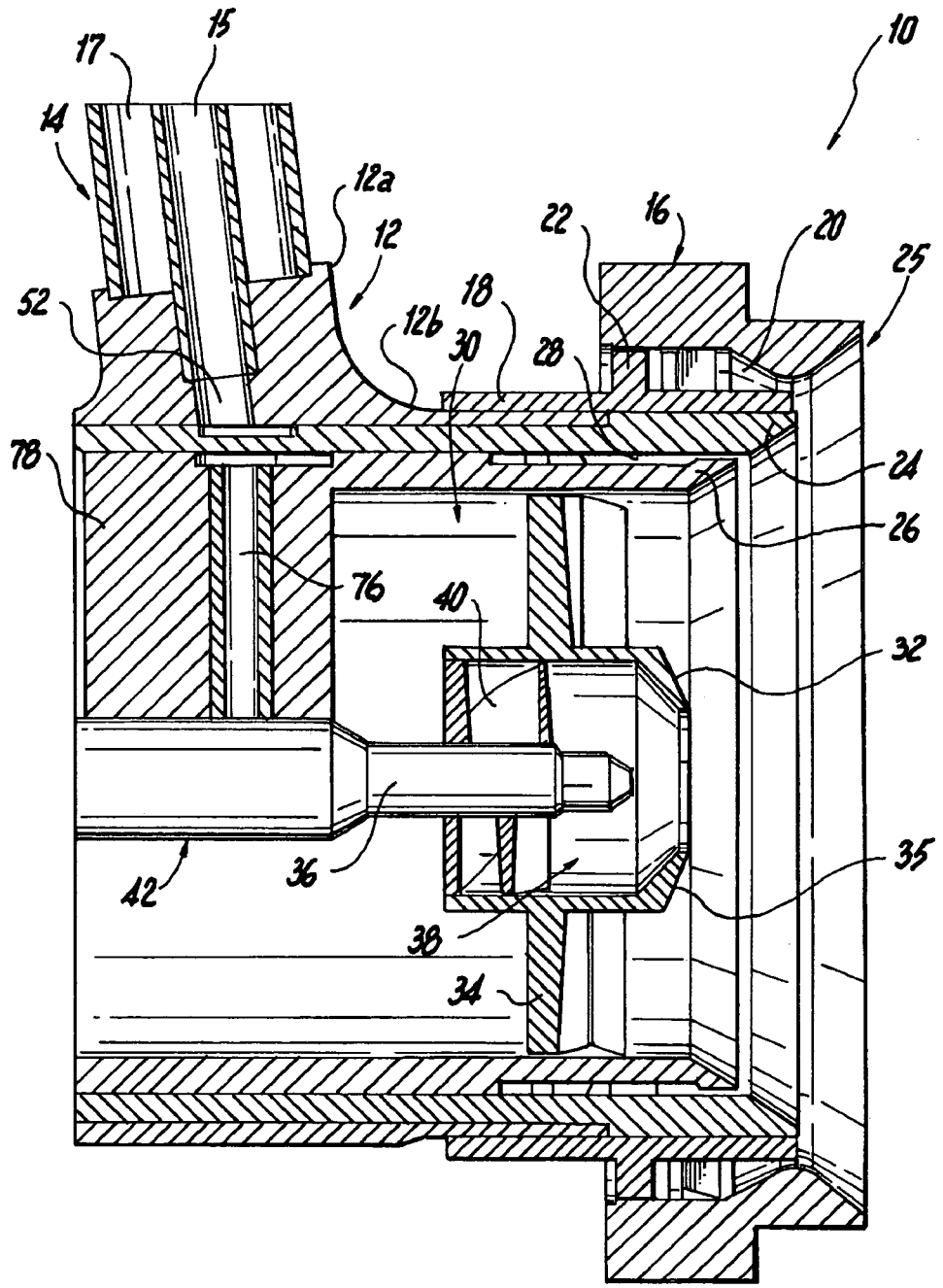
FIG. 4 is a cross-sectional view of the staged air blast fuel injector nozzle of the subject invention taken along line 4-4 of FIG. 2.

At the same time fuel is delivered to nozzle body 12 through feed arm 14, pressurized combustor air is directed into the rear end of nozzle body 12 (FIG. 3) and directed through a series of main and pilot air circuits or passages, which are best seen in FIG. 4. The air flowing through the main and pilot air circuits interacts with the main and pilot fuel flows from feed arm 14. That interaction facilitates the atomization of the main and pilot fuel issued from the forward end of nozzle body 12 and into the combustion chamber of the gas turbine engine.

Referring now to FIG. 4, nozzle body 12 comprises a main fuel atomizer 25 that includes an outer air cap 16 and a main outer air swirler 18. A main outer air circuit 20 is defined between the outer air cap 16 and the outer air swirler 18. Swirl vanes 22 are provided within the main outer air circuit 20, depending from outer air swirler 18, to impart an angular component of swirl to the pressurized combustor air flowing therethrough.

An outer fuel prefilmer 24 is positioned radially inward of the outer air swirler 18 and a main fuel swirler 26 is positioned radially inward of the prefilmer 24. The prefilmer has a diverging prefilming surface at the nozzle opening. As described in more detail herein below, portions of the main and pilot fuel circuits are defined in the outer diametrical surfaces 24a and 26a of the prefilmer 24 and main fuel swirler 26, respectively.

The main fuel circuit receives fuel from the inner feed tube 15 and delivers that fuel into an annular spin chamber 28 located at the forward end of the main fuel atomizer. The main fuel atomizer further includes a main inner air circuit 30 defined between the main fuel swirler 26 and a converging pilot air cap 32. Swirl vanes 34 are provided within the main inner air circuit 30, depending from the pilot air cap 32, to impart an angular component of swirl to the pressurized combustor air flowing therethrough. In operation, swirling air flowing from the main outer air circuit 20 and the main inner air circuit 30 impinge upon the fuel issuing from spin chamber 28, to promote atomization of the fuel.

With continuing reference to FIG. 4, nozzle body 12 further includes an axially located pilot fuel atomizer 35 that includes the converging pilot air cap 32 and a pilot outer air swirler 36. A pilot outer air circuit 38 is defined between the pilot air cap 32 and the pilot outer air swirler 36. Swirl vanes 40 are provided within the pilot outer air circuit 38, depending from air swirler 36, to impart an angular component of swirl to the air flowing therethrough. A pilot fuel swirler 42, shown here by way of example, as a pressure swirl atomizer, is coaxially disposed within the pilot outer air swirler 36. The pilot fuel swirler 42 receives fuel from the pilot fuel circuit by way of the inner pilot fuel bore 76 in support flange 78.

Nozzle body 12 includes a rearward tube mounting section 12a and a forward atomizer mounting section 12b of reduced outer diameter. Tube mounting section 12a includes radially projecting mounting appendage that defines a primary fuel bowl for receiving concentric fuel tube 15 and 17 of feed arm 14. A central main bore 52 extends from the fuel bowl for communicating with inner/main fuel tube 15 to deliver fuel to the main fuel circuit. Dual pilot fuel bores (not shown) communicate with and extend from the fuel bowl for delivering pilot/cooling fuel from outer/pilot fuel tube 15 to the pilot fuel circuit.

Referring now to FIGS. 5A, 5B, 6A and 6B, the outer diametrical surface 24a of outer prefilmer 24 and the outer diametrical surface 26a of main fuel swirler 26 include machined channels or grooves that form portions of the main and pilot fuel circuits or pathways. More particularly, an outer pilot fuel circuit 60 consisting of two generally J-shaped fuel circuit half-sections 60a/60b and a central section 60c, and a main fuel circuit 70 are formed in the outer diametrical surface 24a of the outer prefilmer 24. The main fuel circuit 70 is located rearward of the two pilot fuel circuit half-sections 60a and 60b and consists of a central fuel distribution section 70a which distributes fuel to four feed channels 70b that terminate in twelve (12) axially extending exit sections 70c. As will be discussed hereinbelow, the exit sections 70c provide fuel to the main fuel to exit ports 70d (see FIG. 7). The outer pilot fuel circuit half-sections 60a/60b receive fuel from the pilot fuel tube 17 via the central section 60c. A portion of the pilot fuel provided by the fuel tube 17 is directed to an inner pilot fuel circuit 62 (see FIGS. 5B and 6B) through port 63 The main fuel circuit 70 receives fuel from central fuel bore 52, by way of inner fuel tube 15.

Figure 5A:
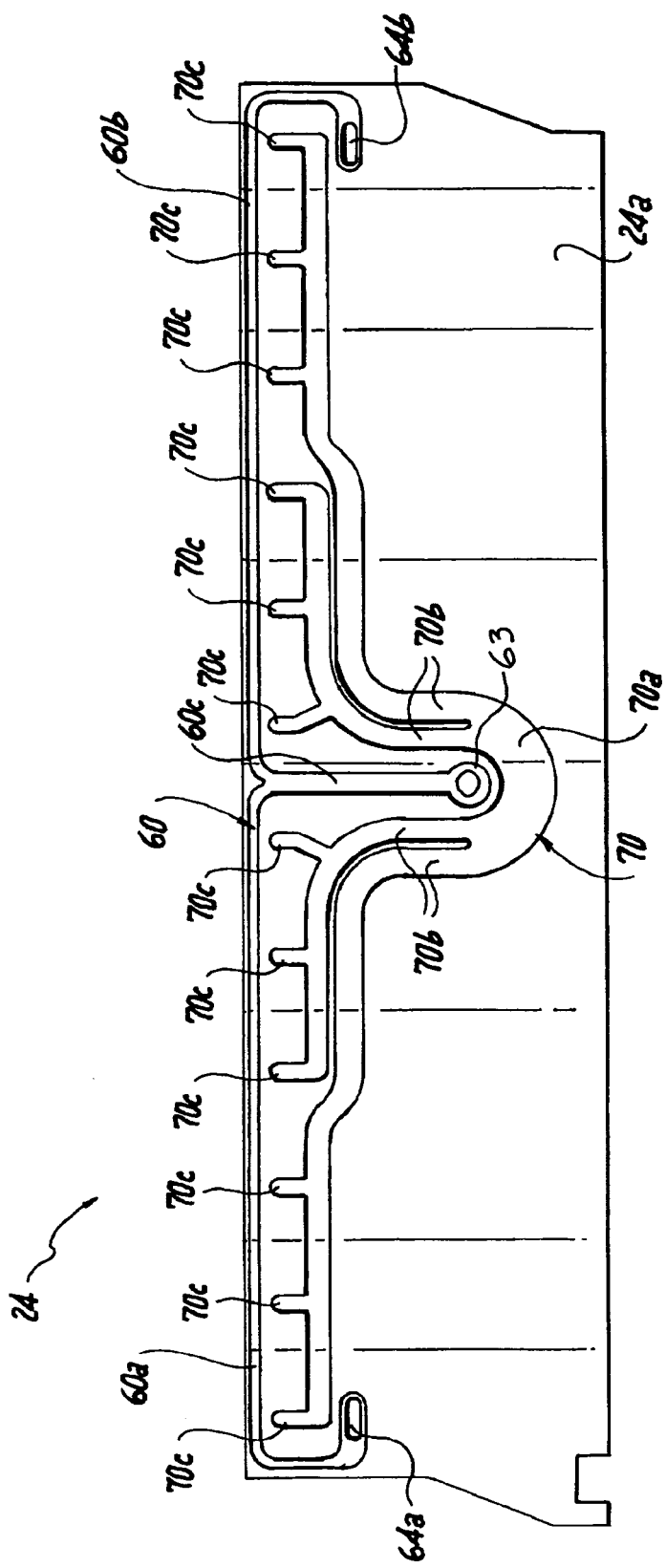
FIG. 5A is a layout view of portions of the main and pilot fuel circuits that have been formed in the prefilmer of an air blast fuel injector nozzle which has been constructed in accordance with a first preferred embodiment of the present invention.
Figure 5B:
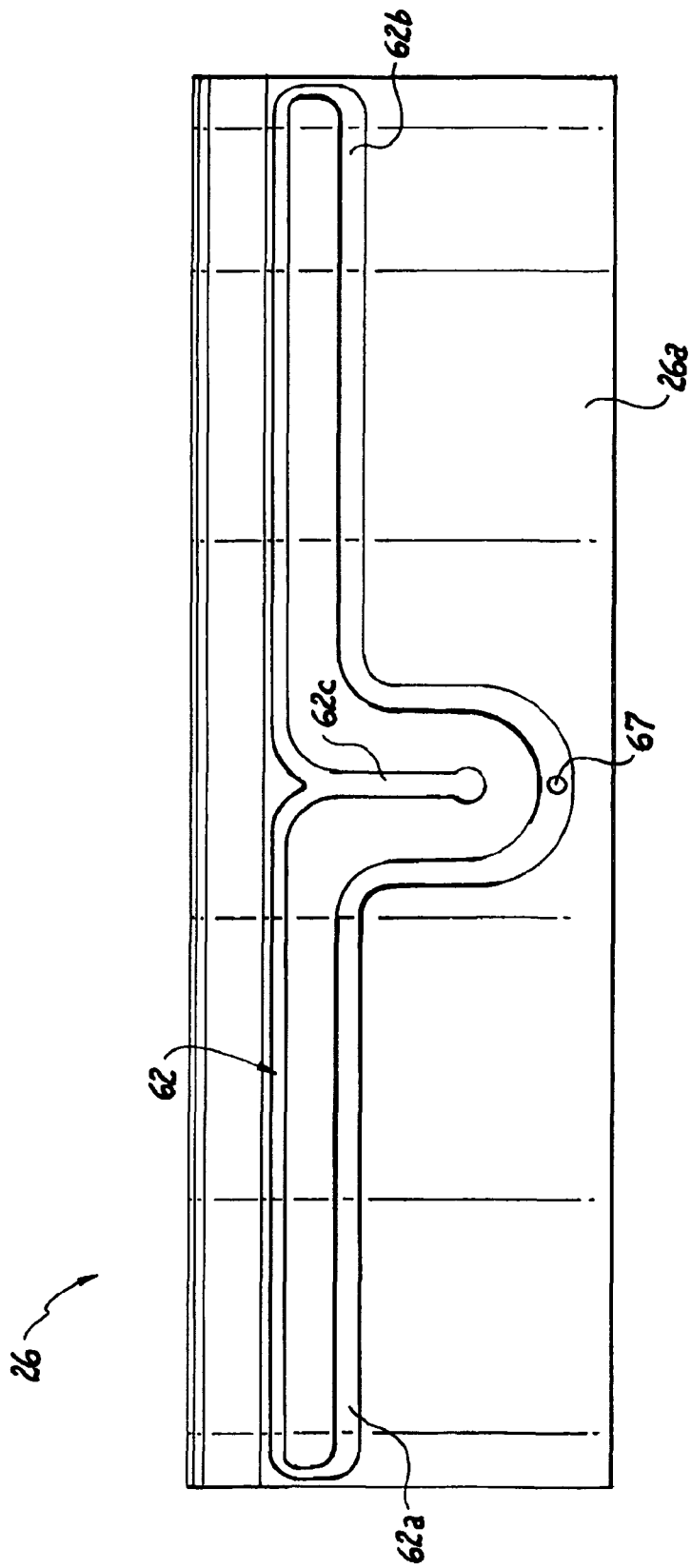
FIG. 5B is a layout view of a portion of the pilot fuel circuits that is formed in the fuel swirler of an air blast fuel injector nozzle which has been constructed in accordance with a first preferred embodiment of the present invention.
Figure 6A:
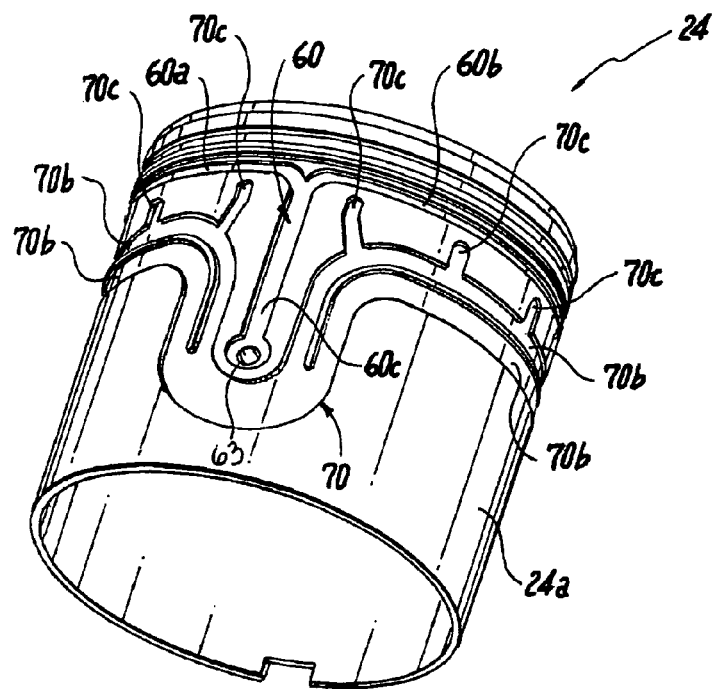
FIG. 6A is a perspective view of the prefilmer used in the first preferred embodiment of the present invention.
Figure 6B:
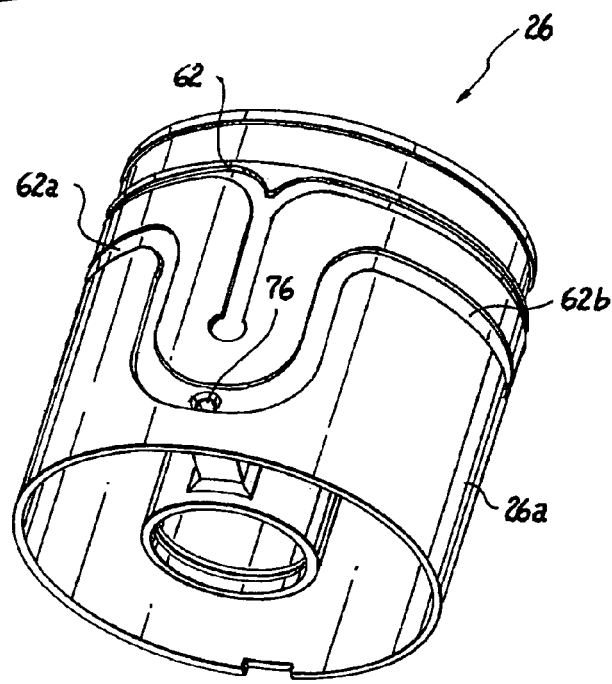
FIG. 6B is a perspective view of the fuel swirler used in the first preferred embodiment of the present invention.

With continuing reference to FIGS. 5B and 6B, the inner pilot fuel circuit 62 of pilot fuel atomizer 35 is formed in the outer diametrical surface 26a of fuel swirler 26. The inner pilot fuel circuit 62 includes a central section 62c, which receives the pilot fuel from port 63, and commonly terminating U-shaped circuit half-sections 62a and 62b. In addition to receiving fuel from the central section 62c, the pilot circuit half-sections 62a and 62b are fed fuel from respective radial transfer ports 64a and 64b (FIG. 5A) associated with outer pilot fuel circuit half-sections 60a and 60b, respectively. Fuel from the pilot circuit half-sections 62a and 62b is directed to the pilot fuel swirler 42 through an inner pilot fuel bore 67 formed in pilot atomizer support flange (not shown), which depends from the interior surface of fuel swirler 26.

In accordance with the subject invention, fuel traveling through the outer and inner pilot fuel circuits 60, 62 is directed into thermal contact with the outer main fuel circuits 70, enroute to the pilot fuel atomizer 35 located along the axis of nozzle body 12.

More particularly, as best seen in FIG. 5A, the outer pilot circuit half-sections 60a and 60b substantially surround the outer main fuel circuit 70. In doing so, the pilot fuel flowing through the pilot outer and inner fuel circuit 60 and 62, protects the main exit sections 70c and exit ports 70d that feed spin chamber 28 from carbon formation during low power operation, when there is typically stagnant fuel located in the main fuel circuit 70.

Figure 7:
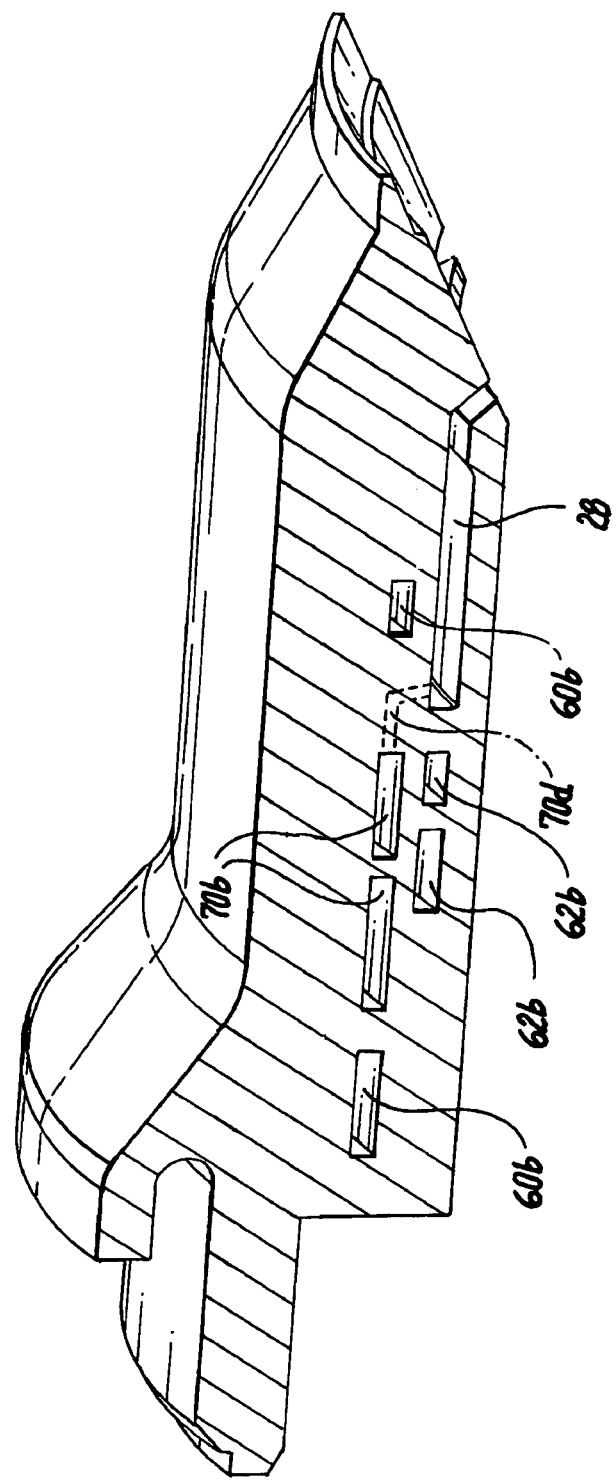
FIG. 7 is a partial cross-sectional view of a portion of the air blast fuel injector nozzle which has been constructed in accordance with a first preferred embodiment of the present invention which illustrates the arrangement of the pilot fuel circuit with respect to the exit ports of the main fuel circuit.

As best seen in FIG. 7, the close proximity of the main fuel circuit 70, and more particularly, the exit ports 70d and pilot inner and outer fuel circuits 60, 62 enables the pilot fuel flow to cool the main fuel flow when the engine is operating at high power and fuel is flowing within both the main and pilot fuel circuits. In essence, the pilot cooling channels act as a multi-pass (or counter-flow) heat exchanger to improve pilot cooling effectiveness.

It should be recognized by those skilled in the art that the full extent of the main fuel atomizer of injector 10 is not cooled by the pilot fuel flow traveling through the inner and outer portions of the pilot fuel circuit 60, 62. Specifically, the external filming surfaces of prefilmer 24 and the spin chamber 28 in fuel swirler 26 downstream from the main exit port 70d are not cooled through thermal interaction with the pilot fuel channels. Moreover, the pilot fuel does not have the cooling capacity to keep the temperature of these exposed surfaces below a point where carbon would form when the main atomizer is staged off.

Referring now to FIGS. 8A through 11 which illustrate a second embodiment of the fuel injector of the present invention which has been designated as reference numeral 200. Fuel injector 200 is similar in construction and operation to injector 10, but as will be discussed below, the main and pilot fuel circuits have a difference layout and fuel channel geometry.

With specific reference to FIGS. 8A, 8B, 9A and 9B, the outer diametrical surface 224a of outer prefilmer 224 and the outer diametrical surface 226a of main fuel swirler 226 include machined channels or grooves that form portions of the main and pilot fuel circuits or pathways. More particularly, an outer pilot fuel circuit 260 and an outer main fuel circuit 270 are formed in the outer diametrical surface 224a of the outer prefilmer 224. The outer pilot fuel circuit 260 consists of two generally U-shaped fuel circuit half-sections 260a/260b and a central section 260c. The outer main fuel circuit 270 includes a central section 270a and two outer segments 270b. The outer main fuel circuit 270 is almost completely surrounded by the outer pilot fuel circuit 260 and is located rearward of a portion of the two pilot fuel circuit half-sections 260a and 260b. The central section 270a of the main fuel circuit 270 terminates is six axially extending exit sections 270c and the two outer segments 270b each terminate in three axially extending exit sections 270c. As will be discussed hereinbelow, the exit sections 270c provide the main fuel to exit ports 270d (see FIG. 11) and from there the fuel is discharged into the spin chamber 238.

The outer pilot fuel circuit half-sections 260a/260b receive fuel from the pilot fuel tube 17 via the central section 260c. A portion of the fuel received from pilot fuel tube 17 is supplied through port 263 to a lower pilot fuel circuit (discussed below). The main fuel circuit 270 receives fuel from a central fuel bore, by way of inner fuel tube 15. The main fuel is provided first to the central section 270a of the outer main fuel circuit 270. A portion of the main fuel traverses the central section 270a and reaches the axially extending exit sections 270c. The remaining fuel passes through an inner main fuel bore 276a formed in the prefilmer 224 and is provided to an inner main fuel circuit 272 formed in the fuel swirler 226.

Figure 8A:
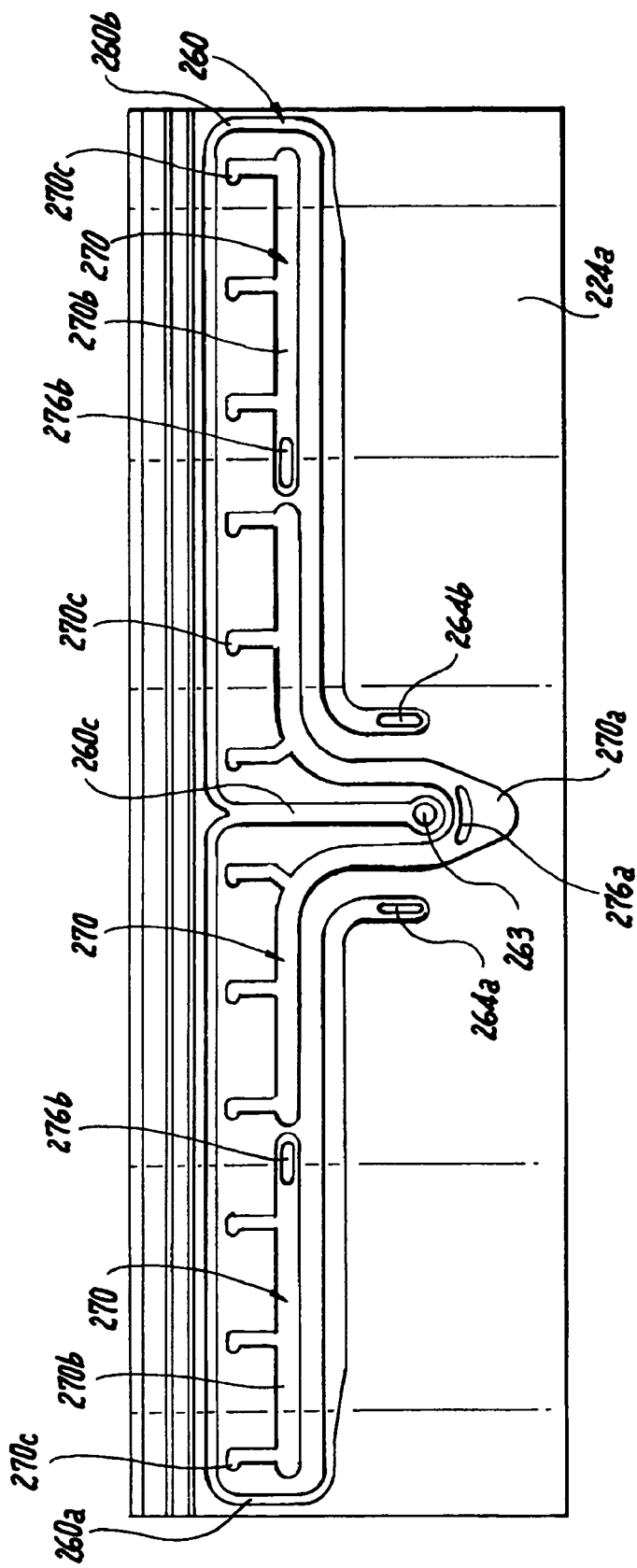
FIG. 8A is a layout view of portions of the main and pilot fuel circuits that have been formed in the prefilmer of an air blast fuel injector nozzle which has been constructed in accordance with a second preferred embodiment of the present invention.
Figure 8B:
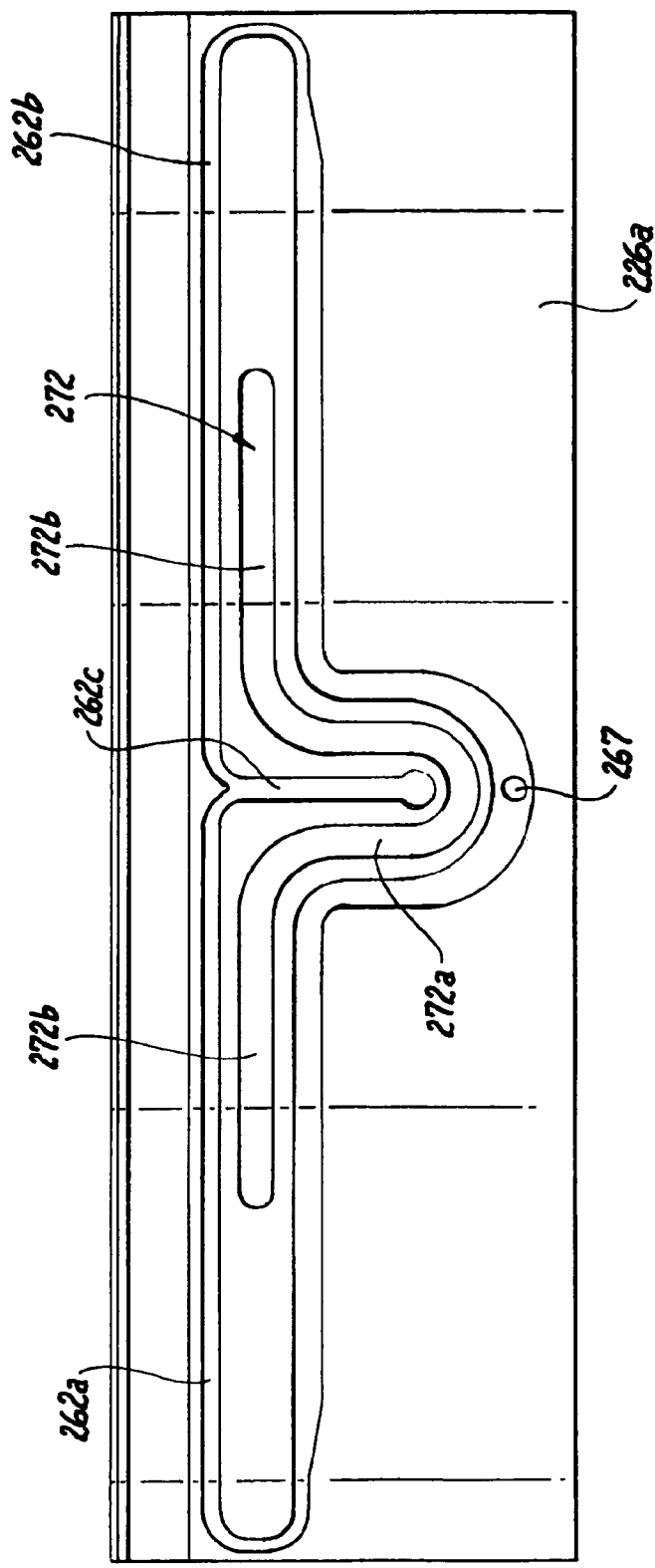
FIG. 8B is a layout view of portions of the main and pilot fuel circuits that have been formed in the fuel swirler of an air blast fuel injector nozzle which has been constructed in accordance with a second preferred embodiment of the present invention.

As shown in FIG. 8B, the inner main fuel circuit 272 has a U-shaped center section 272a which lead to outer passages 272b. The main fuel which is provided to the passages 272b is then supplied to the two outer segments 270b of the outer main fuel circuit 270 through fuel bores 276b (See FIG. 8A). Then the fuel contained in the outer segments 270b of the outer main fuel circuit 270 is received in the axially extending exit sections 270c and discharged to the spin chamber 228 through the exit slots 270d (see FIG. 10).

Figure 9A:
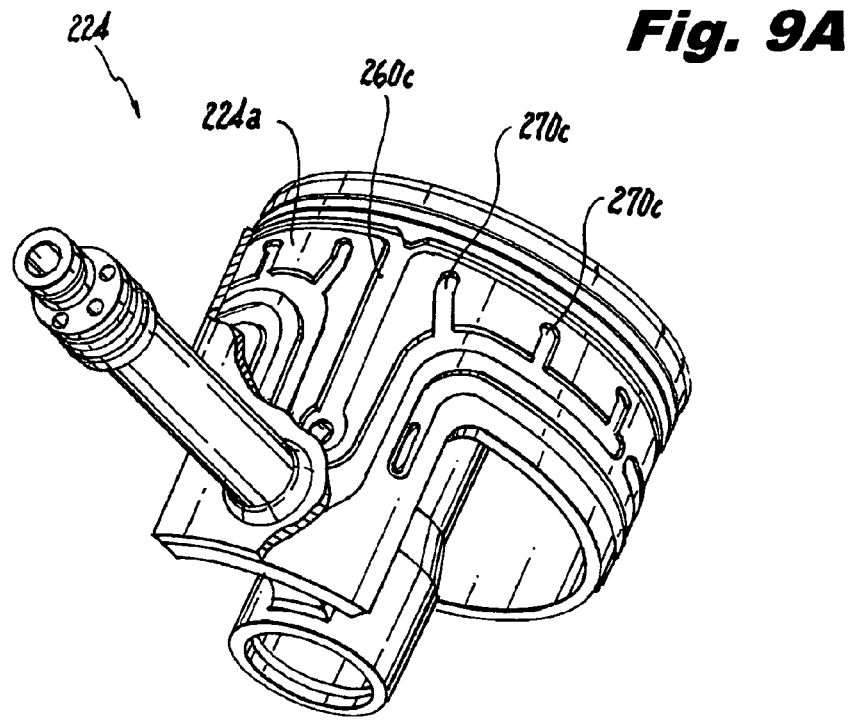
FIG. 9A is a perspective view of the prefilmer used in the second preferred embodiment of the present invention.
Figure 9B:
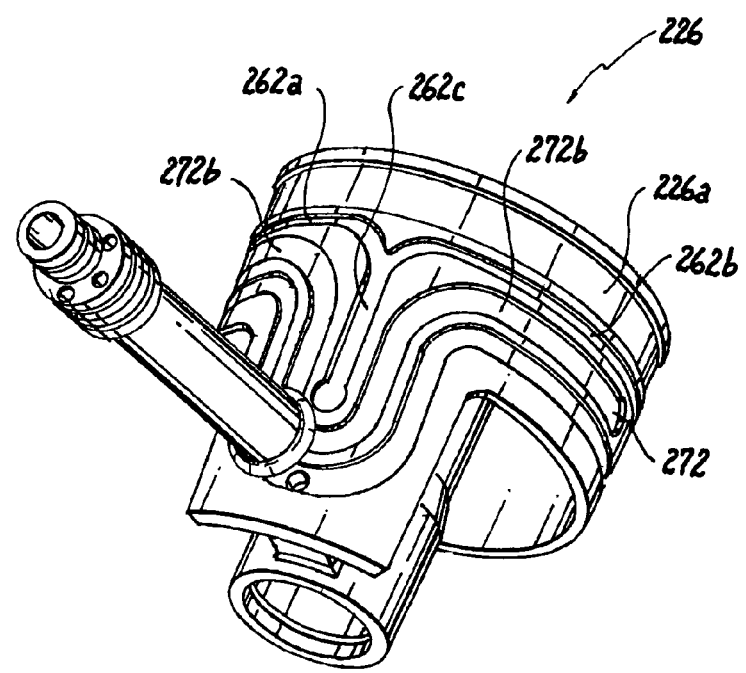
FIG. 9B is a perspective view of the fuel swirler used in the second preferred embodiment of the present invention.

With continuing reference to FIGS. 8B and 9B, an inner pilot fuel circuit 262 of pilot fuel atomizer 35 is also formed in the outer diametrical surface 226a of fuel swirler 226. The inner pilot fuel circuit 262 includes a central section 262c and commonly terminating U-shaped circuit half-sections 262a and 262b. The pilot circuit half-sections 262a and 262b are fed fuel the central section 262c (pilot fuel from port 263) and from respective radial transfer ports 264a and 264b (FIG. 8A) associated with outer pilot fuel circuit half-sections 260a and 260b, respectively, that extend radially through the prefilmer 224. Fuel from the pilot circuit half-sections 262a and 262b is directed to the pilot fuel swirler 242 through an inner pilot fuel bore 267 formed in pilot atomizer support flange (not shown), which depends from the interior surface of fuel swirler 226.

In accordance with the subject invention, fuel traveling through the outer and inner pilot fuel circuits 260, 262 is directed into thermal contact with the outer and inner main fuel circuits 270 and 272, enroute to the pilot fuel atomizer 35 located along the axis of nozzle body 12.

More particularly, as best seen in FIGS. 8A and 8B, the outer pilot circuit half-sections 260a and 260b substantially surround the outer main fuel circuit 270 and the inner pilot circuit half sections 262a and 262b substantially surround the inner main fuel circuit 272. In doing so, the pilot fuel flowing through the pilot outer and inner fuel circuits 260 and 262, protects the main exit sections 270c and exit ports 270d that feed spin chamber 228 from carbon formation during low power operation, when there is typically stagnant fuel located in the main fuel circuit 270.

Figure 11:
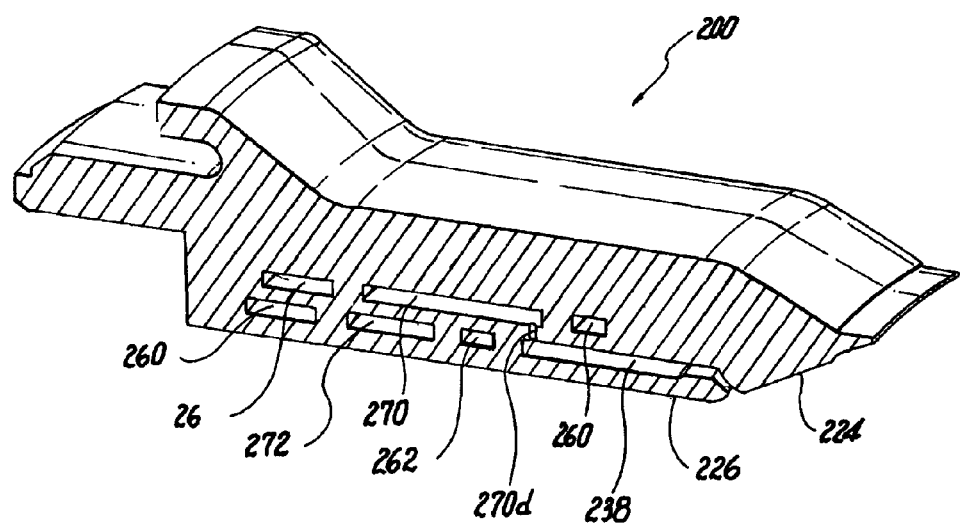
FIG. 11 is a partial cross-sectional view of a portion of the air blast fuel injector nozzle which has been constructed in accordance with a second preferred embodiment of the present invention which illustrates the arrangement of the pilot fuel circuit with respect to the exit ports of the main fuel circuit.

As best seen in FIG. 11, the close proximity of the main fuel circuit 270/272, and more particularly, the exit ports 270d and pilot inner and outer fuel circuits 260, 262 enables the pilot fuel flow to cool the main fuel flow when the engine is operating at high power and fuel is flowing within both the main and pilot fuel circuits. In essence, the pilot cooling channels act as a multi-pass (or counter-flow) heat exchanger to improve pilot cooling effectiveness.

As discussed previously, the present invention can be fabricated using additive manufacturing techniques. For example, the prefilmer can be formed using additive manufacturing. Moreover, the fuel swirler can be formed using additive manufacturing. If additive manufacturing is utilized, portions of the pilot and main fuel circuits can be formed internally within either the prefilmer or the fuel swirler rather than in the outer diametrical surface of these structures, as shown for example in the solid model illustrated in FIG. 11.

Figure 12:
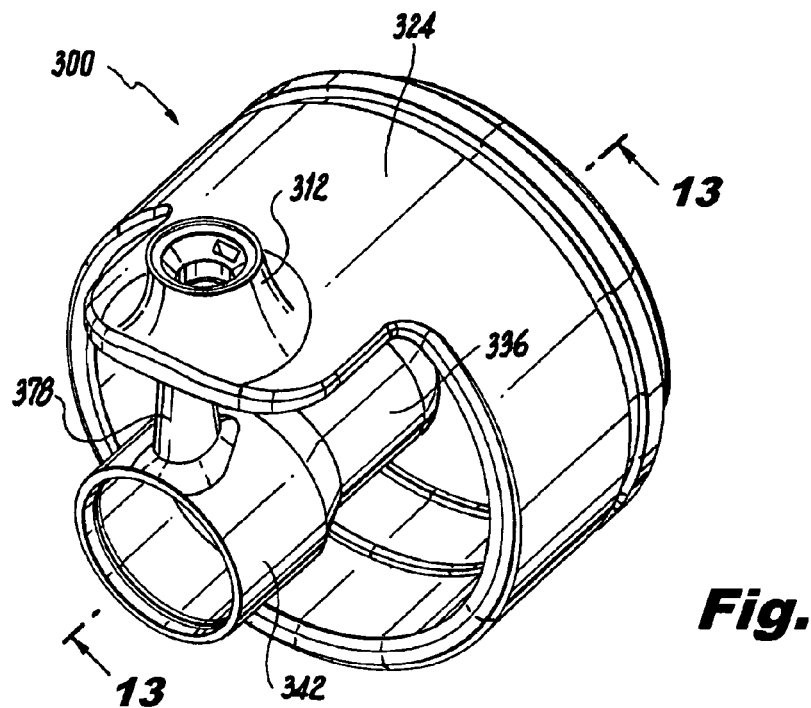
FIG. 12 is a perspective view of a staged air blast fuel injector nozzle constructed in accordance with a third preferred embodiment of the present invention, as viewed from an upstream position.
Figure 13:
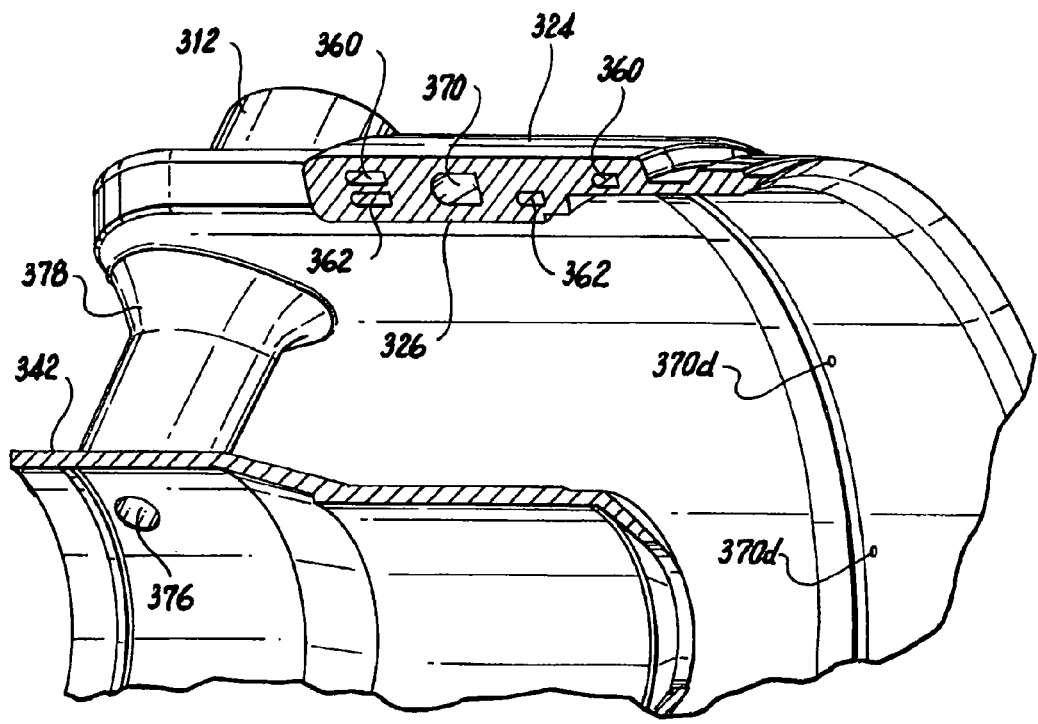
FIG. 13 is a partial cross-sectional view of a portion of the air blast fuel injector nozzle which has been constructed in accordance with the third preferred embodiment of the present invention which illustrates the arrangement of the pilot fuel circuit with respect to the exit ports of the main fuel circuit.

Referring now to FIGS. 12 and 13 which illustrate a third embodiment of the fuel injector of the present invention which has been designated as reference numeral 300. Fuel injection 300 is similar to fuel injector 200, except that portions of fuel injector 300 have been formed as a unitary structure using direct metal laser sintering. More specifically, the prefilmer 324, the tube connector 312 and most of the main fuel swirler 326 have been integrally formed using additive manufacturing. In order to complete the assembly, the remaining portions, such as the forward portion of the fuel swirler can be formed by traditional machining and can be brazed to the unitary assembly formed using additive manufacturing.

Fuel injector 300 was formed using additive manufacturing, so as to have main 370 and pilot fuel circuits 360/362 arranged in a similar layout to those described with respect to fuel injector 200, except that the fuel circuits are formed internally rather than in the outer diametrical surfaces of the components and the upper and lower main fuel circuits have been combined into a single main fuel circuit 370.

Unlike the staged fuel injector described in U.S. Pat. No. 7,506,510 (see prior art FIG. 1), which uses a single pilot cooling channel 160 to cool the main atomizer exit slots 170d during low power operation, the fuel injectors of the present invention use both the outer and inner pilot fuel circuits 60/260/360 and 62/262/362, respectively, to cool the exit ports 70d/270d/370d.

As noted previously, the cooling design described in U.S. Pat. No. 7,506,510 functions well at lower compressor discharge temperatures, like those up to about 30% maximum take-off thrust, but in the recent staging requirements the cooling channels must be capable of performing at engine power levels of up to 60% of the maximum take-off thrust. This represents a substantial increase in the compressor discharge temperature of the air and overheats the stagnant fuel in the un-staged main atomizer.

The present inventor conducted a series of thermal simulations using finite element modeling in order to compare the design described in U.S. Pat. No. 7,506,510 to the present invention. Based on the modeling, the embodiment of the present invention as illustrated in FIG. 8A-11 has a maximum wetted wall temperature that is 50° F. less than the prior art construction.

The main fuel circuit layouts described above move the main exit slots, which in the construction shown in FIG. 1 were formed in the fuel swirler 124, and relocates the slots to the prefilmer, so as to accommodate an additional pilot cooling channels near the spin chamber. The added channels greatly reduce the maximum temperatures near the main exit ports and allows the engine staging point at much higher engine power. In the arrangement shown in FIG. 1, cooling of the main exit slots 170d is limited partly due to the fact that a pilot cooling passage is not provided forward of the exit slots and near the end of the fuel swirler 126 which is exposed to hot compressor discharge air. In the embodiments of the present invention, which have been discussed above, the pilot fuel circuit interrupts the heat from the exposed fuel swirler with a full sized pilot cooling channel before it reaches the main fuel exit ports.

Figure 10:
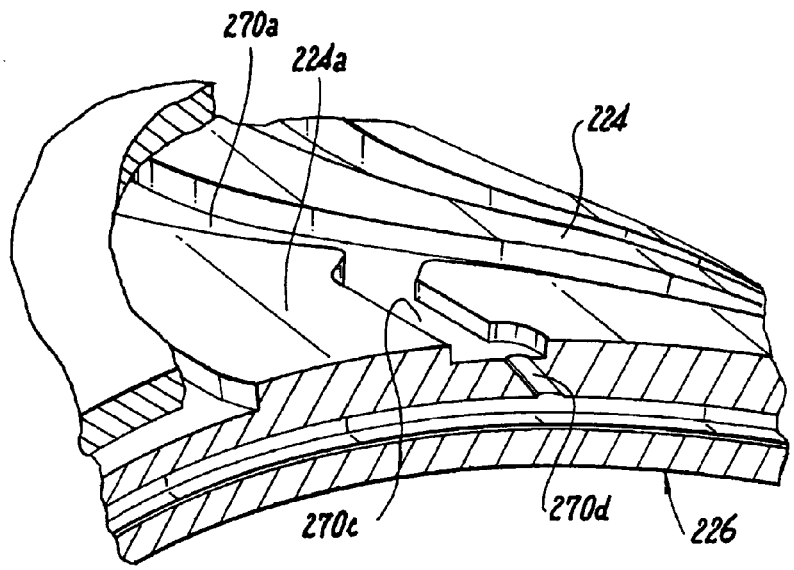
FIG. 10 is a partial cross-sectional view taken at the downstream end of the prefilmer which illustrates an exit port formed in the prefilmer.

Moreover, the present embodiments utilize radial exit holes or ports formed in the prefilmer using, for example, an EDM process. As shown in FIG. 10, the exit holes 270d can be formed at an angle in order to produce a spin and without an axial component or compound angles. The use of an EDM process allows the exit slots to be formed accurately or in a way that is very repeatable, which is important since the exit slots/holes are used to meter the flow to the atomizer.

It should be appreciated that the configuration of the present invention enables an EDM process to be used for the slots/holes, even though the injector/atomizer is made using DMLS. It's a significant advantage to the development and production of the atomizer if the method to produce the exit slot/hole geometry is independent of the method of construction of the rest of the atomizer.

The atomizer can be manufactured from materials such as stainless steel (SS 347) or a nickel based superalloy (Hast-X, Inconel 625, Haynes 230, etc). When additive manufacture is used the basic materials do not need to change. In fact, when additive manufacturing is used, the machinability of the material doesn't matter as much, so additional alloys can be considered, such as cobalt alloys (Haynes 25, HS 188, Stellite, etc) or other difficult to machine alloys. This would allow alloys with better surface hardness, better high temperature strength, etc.

While the subject invention has been described with respect to preferred embodiments, those skilled in the art will readily appreciate that changes and modifications may be made thereto without departing from the spirit and scope of the subject invention as defined by the appended claims.

What is claimed is:
1. A staged fuel injector comprising:
a) a main fuel circuit for delivering fuel from an upstream end to a main fuel atomizer at a downstream end, the main fuel atomizer including a radially outer prefilmer and a radially inner fuel swirler, a radially inner surface of the radially outer prefilmer and a radially outer surface of the radially inner fuel swirler being joined from the upstream end to a midstream region to form said main fuel circuit and spaced apart from the midstream region to a downstream end to define walls of an annular spin chamber, wherein portions of the main fuel circuit are formed in the prefilmer and fuel exit ports associated with the main fuel circuit are formed in the prefilmer and exit into the annular spin chamber; and
b) a pilot fuel circuit for delivering fuel to a pilot fuel atomizer which is located radially inward of the main fuel atomizer, wherein portions of the pilot fuel circuit are formed in the prefilmer and in the fuel swirler and are positioned proximate to and in thermal contact with the fuel exit ports and a portion of the pilot fuel circuit formed in the prefilmer is positioned downstream of the fuel exit ports in a wall of the annular spin chamber defined by the prefilmer.

2. A staged fuel injector as recited in claim 1, wherein portions of the main fuel circuit are formed in the prefilmer and in the fuel swirler.

3. A staged fuel injector as recited in claim 1, wherein the exit ports of the main fuel circuit extend radially through the prefilmer.

4. A staged fuel injector as recited in claim 1, wherein the pilot fuel circuit includes at least one radial passage that extends through the prefilmer to provide communication between the portions of the pilot fuel circuit formed in the prefilmer and the portions of the pilot fuel circuit formed in the fuel swirler.

5. A staged fuel injector as recited in claim 1, wherein the fuel exit ports extend through the prefilmer and into a spin chamber bounded by surfaces of both the prefilmer and swirler.

6. A staged fuel injector as recited in claim 1, wherein the prefilmer is formed using additive manufacturing.

7. A staged fuel injector as recited in claim 1, wherein the fuel swirler is formed using additive manufacturing.

8. A staged fuel injector as recited in claim 1, wherein the prefilmer and at least a portion of the fuel swirler are integrally formed using additive manufacturing.

9. A staged fuel injector as recited in claim 8, wherein a portion of the fuel swirler is formed by machining and is brazed to the portion formed using additive manufacturing.

* * * * *